R. LEDIG.
Spirit Level.
No. 52,579.
Patented Feb. 13, 1866.
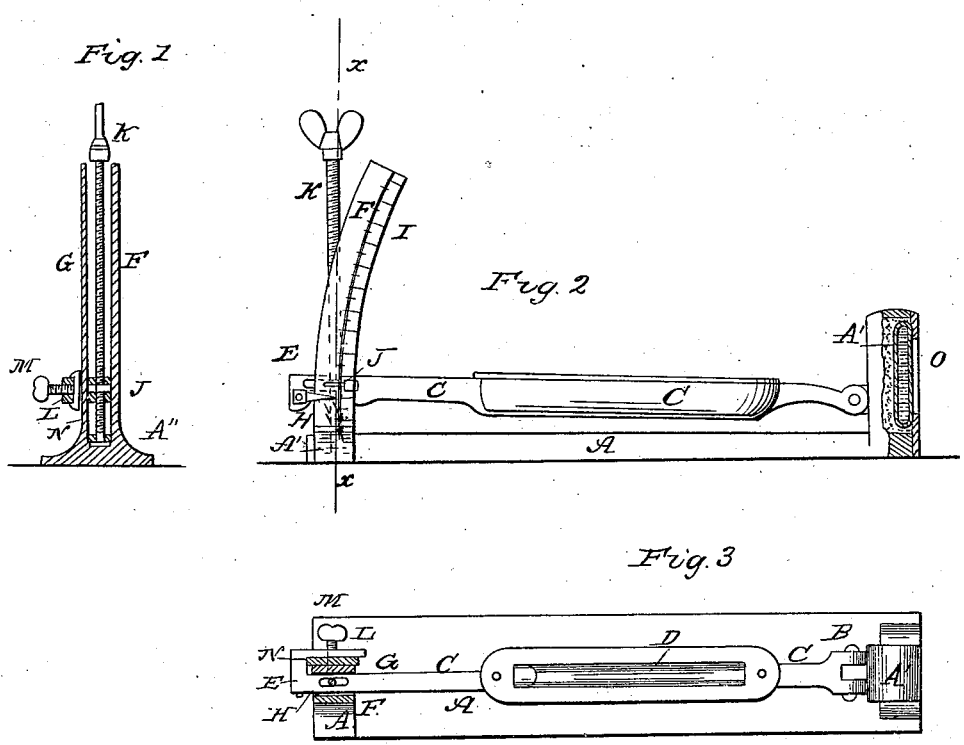

United States Patent Office.

RUDOLPH LEDIG, OF NEWARK, NEW JERSEY.

IMPROVEMENT IN SPIRIT-LEVELS.

Specification forming part of Letters Patent No. 52,579, dated February 13, 1866.

*To all whom it may concern:*

Be it known that I, RUDOLPH LEDIG, of Newark, in the county of Essex and State of New Jersey, have invented a new and useful Improvement in Spirit-Levels; and I do hereby declare that the following is a full, clear, and exact description thereof, which will enable those skilled in the art to make and use the same, reference being had to the accompanying drawings, forming part of this specification, in which—

Figure 1 is a vertical cross-section of my improved level through the line $x\ x$, Fig. 2. Fig. 2 is a side view, partly in section, of the same. Fig. 3 is a top or plan view of the same, partly in section.

Similar letters of reference indicate corresponding parts.

The object of my invention is to furnish an adjustable spirit-level by means of which I may not only be able to tell when a piece of work or machinery is perfectly level, but also how much it varies from a level at any given point and for any given distance; and it consists of a spirit-level of which the arm that carries the spirit-bottle is pivoted at one end to the frame of the level and at the other end connected with an index and scale by means of screws and nuts, as hereinafter more fully described.

A is the main frame of the level, the bottom of which is so ground as to be perfectly level.

To a projection, B, on the front of the upright part A' of the frame A is pivoted the adjustable arm C, which carries the spirit-bottle D in such a way that the free end of said arm may have a vertical movement, said bottle being formed and applied to the level in the ordinary manner.

The forward end, E, of the arm C works between two arms, F and G, projecting upward from the forward end, A'', of the frame A. To the forward end, E, of the arm C is also attached an index, H, pointing to the division-lines of the scales I, marked on the side of the arm F.

The arms F and G are curved, so that the edge of the scale may conform to the arc of the circle described by the point of the index H.

The scale I may be graduated to give the bevel or inclination from a level of the surface to which the instrument may be applied—that is to say, the amount of rise of said surface in any given distance.

Through the end E of the arm C, between the arms F and G, is formed a horizontal slot, in which works a screw-nut, J.

K is a screw having a thread cut upon it corresponding to the thread of the screw-nut J, through which it passes. The said screw passes through a slot in the end E of the arm C, and its lower end terminates in a ball, or its equivalent, working in a socket in the end A'' of the frame A, to enable the screw K to accommodate itself to the varying relative positions of the nut J and the point A'', at which the lower end of said screw is pivoted. The rear and front edges of the nut J are beveled to enable the nut to rock in the slot in which it is placed, so that the plane of the nut may always be at right angles with the direction of the screw K.

Upon the end E of the arm C is formed a square hook, L, through which passes the screw M. The point or end of the screw M terminates in a small cavity in the side of the piece of metal N, placed between the hook L and the arm G, and which, by the advance of the screw M, is forced firmly against the arm G, thus clamping the arm C securely in any desired position.

O is a spirit-bottle placed in the upright part A' of the frame A of the level in a vertical position at right angles to the plane of the bottle D, to be used when it is desired to ascertain whether the surface to which the face of the level is applied is vertical.

What I claim as new, and desire to secure by Letters Patent, is—

1. The combination, in a spirit-level, of the vibrating screw K with the arm C, the nut J, and the frame A, substantially as described, and for the purpose set forth.

2. The combination, in a spirit-level, of the arm C with the frame A, arms F G, index H, and clamp L M N, substantially as described, and for the purpose set forth.

The above specification of my invention signed by me this 5th day of October, 1865.

RUDOLPH LEDIG.

Witnesses:
JAMES T. GRAHAM,
WM. E. LYON.